United States Patent
Ma et al.

(10) Patent No.: US 11,983,012 B2
(45) Date of Patent: May 14, 2024

(54) DYNAMIC FOOTPRINT SET GENERATION METHOD, BIPED ROBOT USING THE SAME, AND COMPUTER READABLE STORAGE MEDIUM

(71) Applicant: UBTECH ROBOTICS CORP LTD, Shenzhen (CN)

(72) Inventors: Xingxing Ma, Shenzhen (CN); Chunyu Chen, Shenzhen (CN); Yizhang Liu, Shenzhen (CN); Ligang Ge, Shenzhen (CN); Hongge Wang, Shenzhen (CN); Jie Bai, Shenzhen (CN); Jiangchen Zhou, Shenzhen (CN); Zheng Xie, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 400 days.

(21) Appl. No.: 17/462,019

(22) Filed: Aug. 31, 2021

(65) Prior Publication Data
US 2022/0206501 A1   Jun. 30, 2022

Related U.S. Application Data

(63) Continuation of application No. PCT/CN2020/140350, filed on Dec. 28, 2020.

(51) Int. Cl.
*G05D 1/00* (2024.01)
*B62D 57/032* (2006.01)

(52) U.S. Cl.
CPC ......... *G05D 1/0214* (2013.01); *G05D 1/0231* (2013.01); *B62D 57/032* (2013.01)

(58) Field of Classification Search
CPC ............... G05D 1/0214; G05D 1/0231; G05D 2201/0217; B62D 57/032
See application file for complete search history.

(56) References Cited

U.S. PATENT DOCUMENTS

| | | | |
|---|---|---|---|
| 2017/0010620 A1* | 1/2017 | Watabe | B25J 19/023 |
| 2023/0076589 A1* | 3/2023 | Zheng | G05D 1/021 |
| 2023/0107084 A1* | 4/2023 | Chen | G05D 1/0246 |
| | | | 701/25 |

FOREIGN PATENT DOCUMENTS

CN   111984013 A   11/2020

OTHER PUBLICATIONS

ISR for PCT/CN2020/140350.
Written opinions of ISA for PCT/CN2020/140350.

* cited by examiner

*Primary Examiner* — Behrang Badii
*Assistant Examiner* — Jay Khandpur

(57) ABSTRACT

A dynamic footprint set generation method, a biped robot using die same, and a computer readable storage medium are provided. The method includes: obtaining preset footprint calculation parameters; calculating a landing point position based on the preset footprint calculation parameters; determining a landing point range based on a landing point position, and performing a collision detection on the landing point range; recording the corresponding landing point position in a footprint set in response to the detection result representing there being no collision; obtaining a preset adjustment amplitude to update a preset displacement angle after the recording is completed; and returning to the calculating the landing point position until the footprint set is generated. By continuously adjusting the preset displacement angle, each landing point position is calculated accordingly, and the valid landing point positions are recorded in the footprint set, which provides more feasible landing points for navigation planning.

20 Claims, 8 Drawing Sheets

DYNAMIC FOOTPRINT SET GENERATION METHOD, BIPED ROBOT USING THE SAME, AND COMPUTER READABLE STORAGE MEDIUM

CROSS REFERENCE TO RELATED APPLICATIONS

The present application is a continuation-application of International Application PCT/CN2020/140350, with an international filing date of Dec. 28, 2020, the contents of all of which are hereby incorporated by reference.

BACKGROUND

1. Technical Field

The present disclosure relates to robot technology, and particularly to a dynamic footprint set generation method, a biped robot using the same, and a computer readable storage medium.

2. Description of Related Art

With the advancement of science and technology, biped robots have developed rapidly and are widely used in many industries. At present, since most buildings and tools are designed in accordance with the height and shape of humans, the biped robot as a robot platform has better flexibility in use than other kinds of robots. At the same time, the computation and planning of the footprint sets of the biped robot is a key point for the robot to walk smoothly. A footprint set refers to a set of all feasible landing points for each step for lire navigation planning of the biped robot, and the landing points in each footprint set that meet the condition of the solution of the optimal path jointly form a part of the optimal path of the biped robot.

In a simple environment, the footprint sets with a present number of footprints will be adequate to complete the navigation planning tasks. However, in a complex environment with more obstacles, there is still no mature solution for how to design and select the size of the footprint set. When the preset footprint set is too large, the efficiency of the navigation planning will drop sharply, while the probability of no solution will increase when the preset footprint set is too small.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

It should be noted that, in all the embodiments of the present disclosure, the orientation O (see FIG. 3) which the biped robot faces is taken as the reference orientation, and the straight line perpendicular to the reference orientation is taken as the horizontal line.

Figure 1:
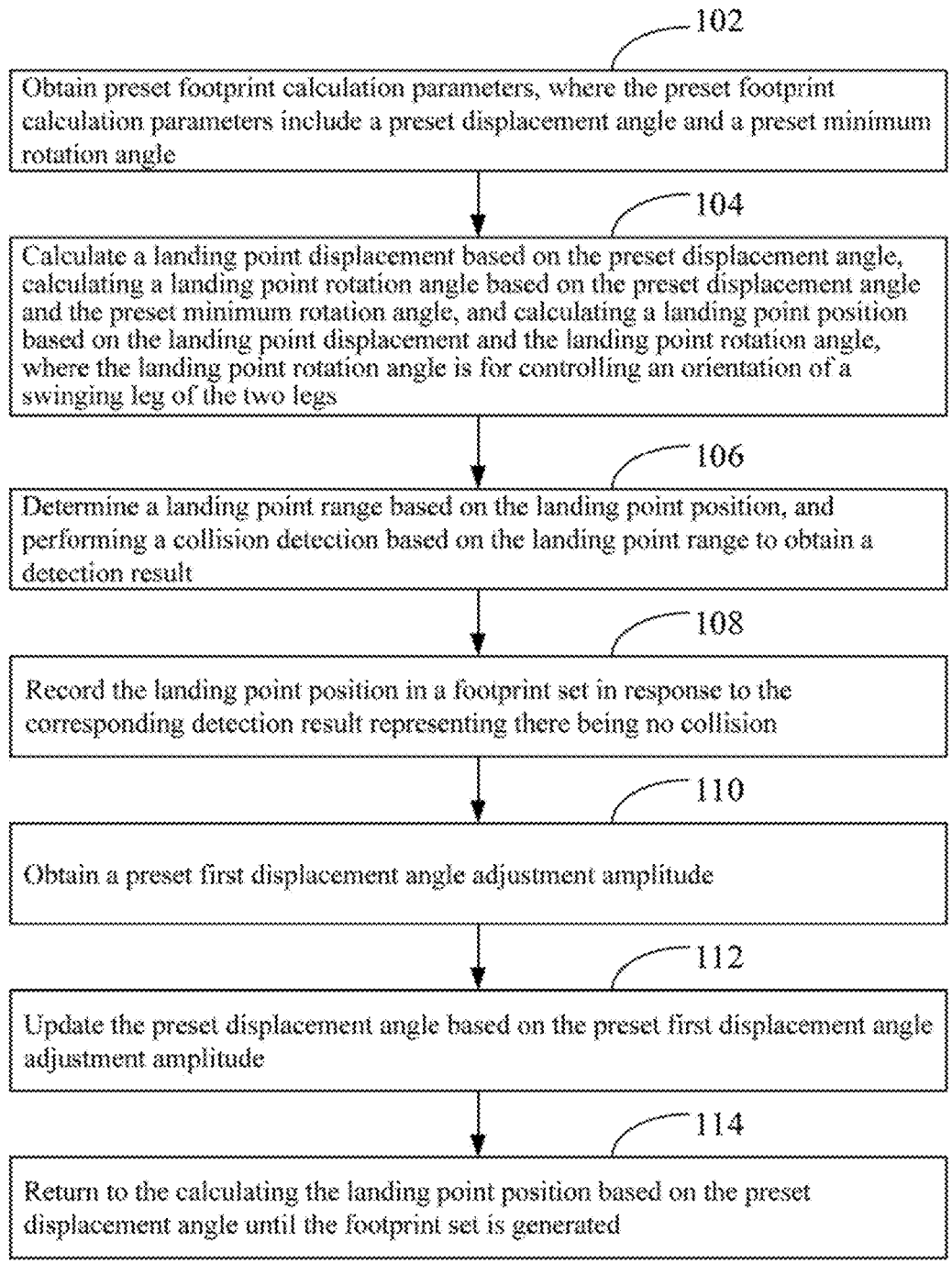
FIG. 1 is a flow chart of a dynamic footprint set generation method according to an embodiment of the present disclosure.

FIG. 1 is a flow chart of a dynamic footprint set generation method according to an embodiment of the present disclosure. In this embodiment, the dynamic footprint set generation method is for a biped robot, which is a computer-implemented method executable for a processor. The biped robot may have two leg that are connected to a trunk via joint(s). Each limb such as the leg may include one or more links with a joint connected therebetween. The method may be implemented through a dynamic footprint set generation apparatus shown in FIG. 7 or a biped robot shown in FIG. 8. As shown in FIG. 1, the method may include the following steps.

102: obtaining preset footprint calculation parameters, where the preset footprint calculation parameters include a preset displacement angle and a preset minimum rotation angle.

Figure 3:
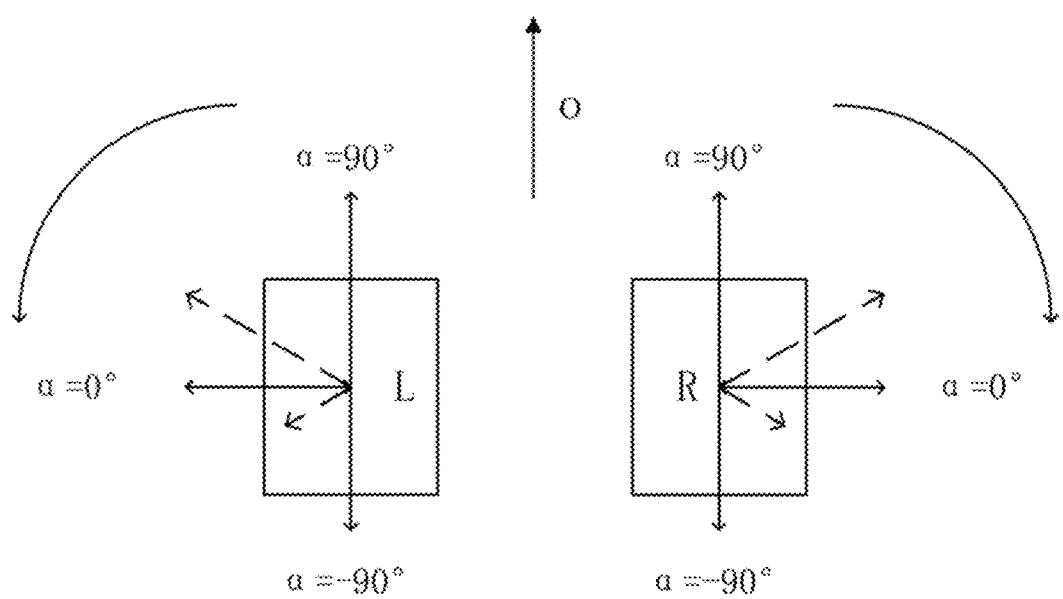
FIG. 3 is a schematic diagram of searching for landing points positions in the dynamic footprint set generation method of FIG. 1.

In which, the two legs of the biped robot, that is, the left leg L and the right leg R (see FIG. 3), are moved alternately, the leg that is ready to move is called the "swinging leg" while the other foot that is not moving is called the "supporting leg". The footprint calculation parameters refer to parameters for calculating landing point positions, that is, the possible positions of the landing of the swinging leg. The displacement angle refers to the acute or right angle formed between the possible displacement of the swinging leg and the horizontal line. Taking the horizontal line as the boundary, the displacement angle between the displacement in the orientation corresponding to the reference orientation and the horizontal line will be a positive angle, and the displacement angle between the displacement in the opposite orientation to the reference orientation and the horizontal line will be a negative angle. FIG. 3 is a schematic diagram of searching for landing points positions in the dynamic footprint set generation method of FIG. 1. In one embodiment, as shown in FIG. 3, when the swinging leg moves in the reference orientation, its displacement angle is 90°, and when the swinging leg moves in the opposite orientation to the reference orientation, its displacement angle is −90°.

Because the robot is restricted by kinematics and dynamics, the rotation angle of the swinging leg of the robot is limited. Therefore, in order to avoid damage caused by exceeding the limitation, the preset minimum rotation angle is needed. In which, the minimum rotation angle has the maximum value in the negative orientation.

Figure 2:
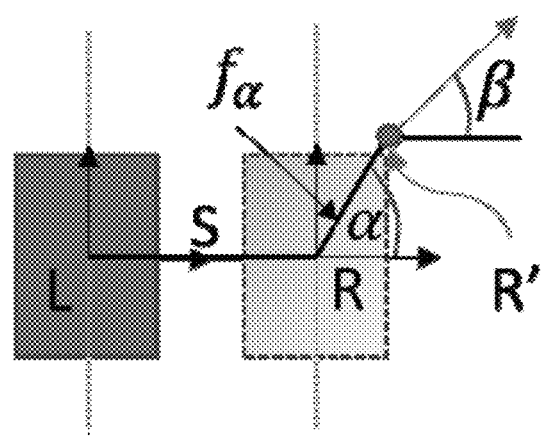
FIG. 2 is a schematic diagram of parameterizing lauding point positions according to an embodiment of the present disclosure.

FIG. 2 is a schematic diagram of parameterizing landing point positions according to an embodiment of the present disclosure. In one embodiment, as shown in FIG. 2, L and R represent the local coordinate system where the center of the left and right legs are located, respectively. R' represents the position of the right leg (i.e., the swinging leg) when it landed after swinging, α is the displacement angle between the displacement of the right foot and the horizontal line.

It should be noted that, this method is applied to a biped robot, and the robot swings its legs alternately and calculates the footprint set for the next step of the swinging leg. In one embodiment, before dynamically generating the footprint set, the preset footprint calculation parameters are initialized to obtain the preset displacement angle and the preset minimum rotation angle.

104: calculating a landing point displacement based on the preset displacement angle, calculating a landing point rotation angle based on the preset displacement angle and the preset minimum rotation angle, and calculating a landing point position based on the landing point displacement and the landing point rotation angle, where the landing point rotation angle is for controlling an orientation of a swinging leg of the two legs.

In which, the landing point displacement refers to the possible displacement of the swinging leg in the swinging, which includes the distance and the orientation. The landing point rotation angle is used to control the orientation of the swinging leg, which is an acute or right angle formed by the orientation of the swinging leg and the horizontal line. The landing point position refers to the position where the swinging leg may land onto. The landing point displacement is used to determine the landing point of the swinging leg, while the landing point rotation angle is used to determine the orientation of the swinging leg. As shown in FIG. 2, $f_α$ is the landing point displacement with a displacement angle of α and a distance of RR', and β is the landing point rotation angle generated between the orientation of the right leg after swinging and the horizontal line. The position of R' relative to the local coordinate system of L is represented by S (the distance between L and R), $f_α$, and α while the angle of R' relative to the local coordinate system of L is represented by β. Since S is a fixed value, the pose (i.e., the position and orientation) of the landing point can be represented by $f_α$, α, β).

106: determining a landing point range based on the landing point position, and performing a collision detection based on the landing point range to obtain a detection result.

In which, the landing point of the swinging leg is determined based on the landing point displacement in the landing point position first, then the orientation of the swinging leg is determined based on the landing point rotation angle, and finally a specific area covered by the landing point position is determined based on the preset shape and size of (the foot of) the swinging leg of the biped robot. The collision detection is performed based on the specific area.

In one embodiment, by traversing the pixels in the specific area, it identifies whether there is an obstacle in the specific area that has a different color from the background, thereby obtaining the result of collision detection.

In other embodiments, after determining the specific area covered by the landing point position, the image of the specific area may be inputted into a trained neural network for identification, and the result of collision detection may be obtained according to the result output by the neural network.

108: recording the landing point position in a footprint set in response to the corresponding detection result representing there being no collision.

In which, in the case that the detection result represents no collision, it indicates that the corresponding landing point position is a valid and feasible landing point for the swinging leg. After recording the corresponding landing point position in the footprint set, it continues to search and calculate the next valid and feasible landing point until the generation of the footprint set is completed.

110: obtaining a preset first displacement angle adjustment amplitude.

In which, the preset first displacement angle adjustment amplitude refers to a value of a preset adjustment amplitude for the preset displacement angle, which is used to adjust and update the preset displacement angle. The preset first displacement angle adjustment amplitude may be a positive number or a negative number.

112: updating the preset displacement angle based on the preset first displacement angle adjustment amplitude.

In which, after the valid landing point is searched out in the orientation of the preset displacement angle, in order to search for the next optional landing point, the preset displacement angle is updated to facilitate the calculation of the next landing point position using the updated preset displacement angle.

In one embodiment, as shown in FIG. 3, the biped robot searches for the valid landing point positions in the range of −90°-0°-90°. For example, after initialization, the preset displacement angle is 90° that represents naturally forward, the preset first displacement angle adjustment amplitude is set to −60°, and after the biped robot has searched and recorded the valid landing point position in the orientation of 90°, it updates the preset displacement angle based on the preset first displacement angle adjustment amplitude, and then searches in the orientation of the updated preset displacement angle of 30°. In this manner, the robot will search for the landing point position in the orientations of 90°, 30°, −30°, −90° in turn, and record the valid landing point position in the corresponding footprint set.

It should be noted that, if the preset angle after initialization is −90°, the corresponding preset first displacement angle adjustment amplitude may be set to 60°.

Furthermore, in the case that the orientation of searching for the landing point position is from front to back, that is, from 90° to −90°, the preset first displacement angle adjustment amplitude will be a negative number; on the contrary, in the case that the orientation of searching the landing point position is from back to front, that is, from −90° to 90°, the preset first displacement angle adjustment amplitude will be a positive number.

114: returning to step 104 until the footprint set is generated.

In which, after the updated preset displacement angle is obtained, the landing point position is calculated based on the updated preset displacement angle, then collision detection is performed based on the landing point position to record the valid landing point position without collision in the footprint set, and finally the preset displacement angle is updated based on the preset first displacement angle adjustment amplitude. Then, it executes the step of calculating the landing point position (i.e., step 104), thereby looping continuously.

In which, the generation of the footprint set will be completed when the adjusted and updated preset displacement angle reaches a preset threshold condition.

In the above-mentioned dynamic footprint set generation method, it first obtains preset footprint calculation parameters, where the preset footprint calculation parameters include u preset displacement angle and a preset minimum rotation angle; calculates a landing point displacement based on the preset displacement angle, calculates a landing point rotation angle based on the preset displacement angle and the preset minimum rotation angle, and calculates a landing point position based on the landing point displacement and the landing point rotation angle; determines a landing point range based on the landing point position, performs a collision detection based on the landing point range to record the landing point positions without collision in the detection result in the footprint set, and obtains the preset first displacement angle adjustment amplitude to update the preset displacement angle; and finally calculates the next landing point position based on the updated preset displacement angle until the generation of the footprint set is completed. In this manner, by continuously adjusting the preset displacement angle, each landing point position is calculated accordingly, and the landing point positions without collision in the detection result are recorded in the footprint set. The footprint set provides more feasible landing points to the biped robot when performing navigation planning, and can be calculated using only one displacement angle as a variable, which shorten the calculation time, reduces the probability that the landing point planning has no solution, and improves the efficiency of navigation planning.

In one embodiment, after the performing the collision detection based on the landing point range to obtain the detection result, the dynamic footprint set generation method further includes: determining the landing point displacement corresponding to the landing point position in response to the corresponding detection result representing there being a collision; obtaining the preset displacement adjustment amplitude; updating the landing point displacement based on the preset displacement adjustment amplitude, and calculating the updated landing point position based on the updated landing point displacement; and returning to the step of performing the collision detection based on the landing point range to obtain the detection result.

In which, the preset displacement adjustment amplitude refers to the amplitude for adjusting the landing point displacement, which is used to adjust and update the landing point displacement. In the orientation of the preset displacement angle, if the calculated landing point position is not a valid landing point position, the landing point displacement will be adjusted according to the preset displacement adjustment amplitude to keep the orientation of the preset displacement angle unchanged. Then the landing point displacement is continuously reduced based on the preset displacement adjustment amplitude until a valid landing point position is found in the orientation of the preset displacement angle or the adjusted landing point displacement reaches a preset threshold condition, thereby completing the search in the orientation of the preset displacement angle.

It should be noted that, under the limitations of the shape and motion capability of the current biped robot, the landing point position calculated based on the preset displacement angle is the farthest point that the robot can reach in the orientation of the preset displacement angle, and the adjustment of the landing point displacement can only be reducing, so the preset displacement adjustment amplitude will be a negative number.

Figure 4:
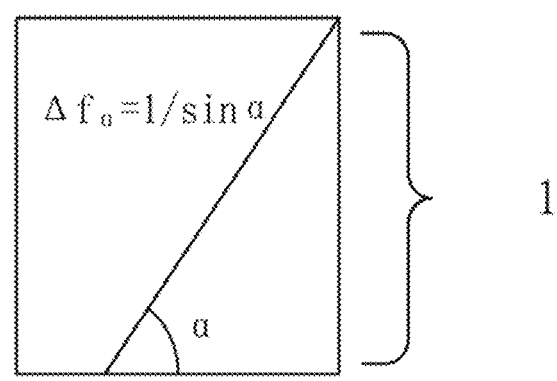
FIG. 4 is a schematic diagram of the preset displacement adjustment amplitude according to an embodiment of the present disclosure.

In one embodiment, the preset displacement adjustment amplitude is determined according to the smallest cell of the image of the robot (e.g., the image captured by the robot), and the footing displacement is adjusted according to the smallest cell to accurately obtain the farest valid landing point position in the current orientation of the preset displacement angle, so as to provide a better solution for the navigation planning of the optimal path. FIG. 4 is a schematic diagram of the preset displacement adjustment amplitude according to an embodiment of the present disclosure, as shown in FIG. 4, if the side length of the smallest cell is 1, the adjustment amplitude $\Delta f_\alpha$ will be $1/\sin \alpha$.

In one embodiment, after the updating the landing point displacement based on the preset displacement adjustment amplitude, the dynamic footprint set generation method further includes: determining whether the updated landing point displacement is less titan a preset threshold, and returning to the step of calculating the updated landing point position based on the updated landing point displacement in response to the updated landing point displacement being not less than the preset threshold; obtaining a preset second displacement angle adjustment amplitude in response to the updated landing point displacement being less than the preset threshold, where the preset second displacement angle adjustment amplitude is less than the preset first displacement angle adjustment amplitude; updating the preset displacement angle based on the preset second displacement angle adjustment amplitude; and returning to the step of calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

In which, the preset threshold can be set according to actual needs. In one embodiment, the preset threshold may be set to 0, that is, the valid landing point position has not been searched in the orientation of the preset displacement angle, and the search in the orientation of the preset displacement angle will be ended and then execute the next search step when the landing point displacement is less than or equal to 0 after a plurality of adjustments. The preset threshold may also be set to other values. In the specific implementation, for the sake of improving the search efficiency, the footing position that is too close to the position before the swinging may be abandoned, hence the position of the landing point may be limited by the preset threshold.

In which, the preset second displacement angle adjustment amplitude refers to the amplitude for adjusting the preset displacement angle, which is used to adjust and update the preset displacement angle. The preset second displacement angle adjustment amplitude is less than the preset first displacement angle adjustment amplitude.

Figure 5:
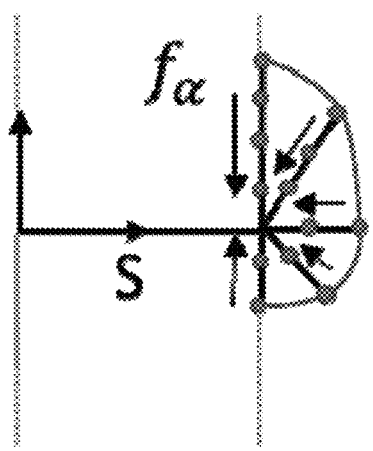
FIG. 5 is a schematic diagram of searching for landing point positions during collision detection according to an embodiment of the present disclosure.

As an example, the swinging leg is the right foot, the valid landing point position is searched within −90°-0°-90°, the preset displacement angle after initialization is 90°, and the preset second displacement angle adjustment amplitude is −45°. FIG. 5 is a schematic diagram of searching for landing point positions during collision detection according to an embodiment of the present disclosure. As shown in FIG. 5, S is the distance between the left and right feet of the robot, and $f_\alpha$ is the landing point displacement. In this embodiment, the valid landing point cannot be searched out in the orientation that the preset displacement angle is 90° and the searching is still fail after 3 times of the landing point displacement adjustments, and the displacement is less than or equal to the preset threshold 0 after the landing point displacement is adjusted again, then the preset displacement angle is adjusted and updated according to the preset second displacement angle adjustment amplitude to search a valid landing point in the orientation of 45°. In this manner, the biped robot will search for the landing point positions in the orientations of 90°, 45°, 0°, −45°, −90° sequentially, and the landing point displacement calculated based on the preset displacement angle is used as the farthest point in each orientation. The process of continuously reducing the displacement and triggering the condition of the reduced displacement being less than the preset threshold, adjusting the preset displacement angle, calculating the landing point position, and reducing the displacement, until the preset displacement angle reaches the preset threshold conditions for the generation of the footprint set.

It can be understood that, the preset second displacement angle adjustment amplitude is the same as the preset first displacement angle adjustment amplitude that its positive or negative value is determined by the orientation of searching the landing point position, in the case that the orientation of searching the landing point position is from front to back, that is, from 90° to −90°, the preset second displacement angle adjustment amplitude will be a negative number; on the contrary, in the case that the orientation of searching the landing point position is from back to front, that is, from −90° to 90°, the preset second displacement angle adjustment amplitude will be a positive number.

It should be noted that, the preset displacement angle may be adjusted according to an equation of:

$$\alpha = \alpha + \Delta\alpha \quad (3)$$

where, $\alpha$ is the preset displacement angle, and $\Delta\alpha$ is the displacement angle adjustment amplitude which may be the preset first displacement angle adjustment amplitude or the preset second displacement angle adjustment amplitude.

In one embodiment, in step 114, the footprint set is determined as having been generated in response to the updated preset displacement angle meeting a preset threshold condition.

In which, the preset threshold refers to the maximum or minimum value of the angle range of the biped robot to search for the valid landing point position, and the preset threshold condition refers to that the updated preset displacement angle is larger than the maximum value of the angle range or less than the minimum value of the angle range.

In one embodiment, the calculating the landing point rotation angle based on the preset displacement angle and the preset minimum rotation angle includes: using the preset displacement angle as the landing point rotation angle in response to the preset displacement angle being larger than the preset minimum rotation angle; and using the preset minimum rotation angle as the landing point rotation angle in response to the preset displacement angle being smaller than the preset minimum rotation angle.

In which, the minimum rotation angle is not necessarily the extreme angle that the mechanical foot can rotate, and may also be set by considering the obtaining of valid data. The data corresponding to the too small rotation angle is not required, hence the calculation of the landing point position is limited based on the minimum rotation angle.

In one embodiment, the determining the landing point position based on the landing point displacement and the landing point rotation angle includes:

calculating the landing point position through an equation of:

$$f\alpha = \begin{cases} 0.3 * \sqrt{(\cos \alpha/3)^2 + (\sin \alpha)^2} & (0° < \alpha \le 90°) \\ 0.1 * \sqrt{(\cos \alpha)^2 + (\sin \alpha)^2} & (-90° < \alpha \le 0°) \end{cases} \quad ; \text{and} \quad (1)$$

$$\beta = \max(\alpha, \beta_{min}); \quad (2)$$

where, $\alpha$ is a displacement angle of the swinging leg, $f_\alpha$ is a displacement of the swinging leg, $\beta$ is a rotation angle of the swinging leg, and $\beta_{min}$ is the preset minimum rotation angle.

In which, equation (1) is for calculating the corresponding landing point displacement based on the displacement angle, and equation (2) is for calculating the landing point rotation angle based on the displacement angle. The landing point position is obtained based on the calculated landing point displacement and landing point rotation angle.

It should be noted that, in this embodiment, in equation (1) that is for calculating the landing point displacement, the fixed parameters of 0.3 and 0.1 are selected according to the actual motion capability of the biped robot, and are determined by the foot length, stride length and other factors of the robot jointly, hence the motion capability of the robot can be utilized to the maximum. In other embodiments, if a biped robot of another model is used, that is, the dynamic footprint set generation method is implemented through a biped robot with different specification, the two fixed parameters can be changed correspondingly.

In one embodiment, after the determining the footprint set as having been generated, the dynamic footprint set generation method further includes: adding the landing point positions in the footprint set to a candidate queue of the next node of the robot, so that the biped robot selects a footprint meeting an optimal path from the candidate queue.

In which, the node refers to the position of each landing point of the biped robot in the optimal path from the starting point to the target point.

Figure 6:
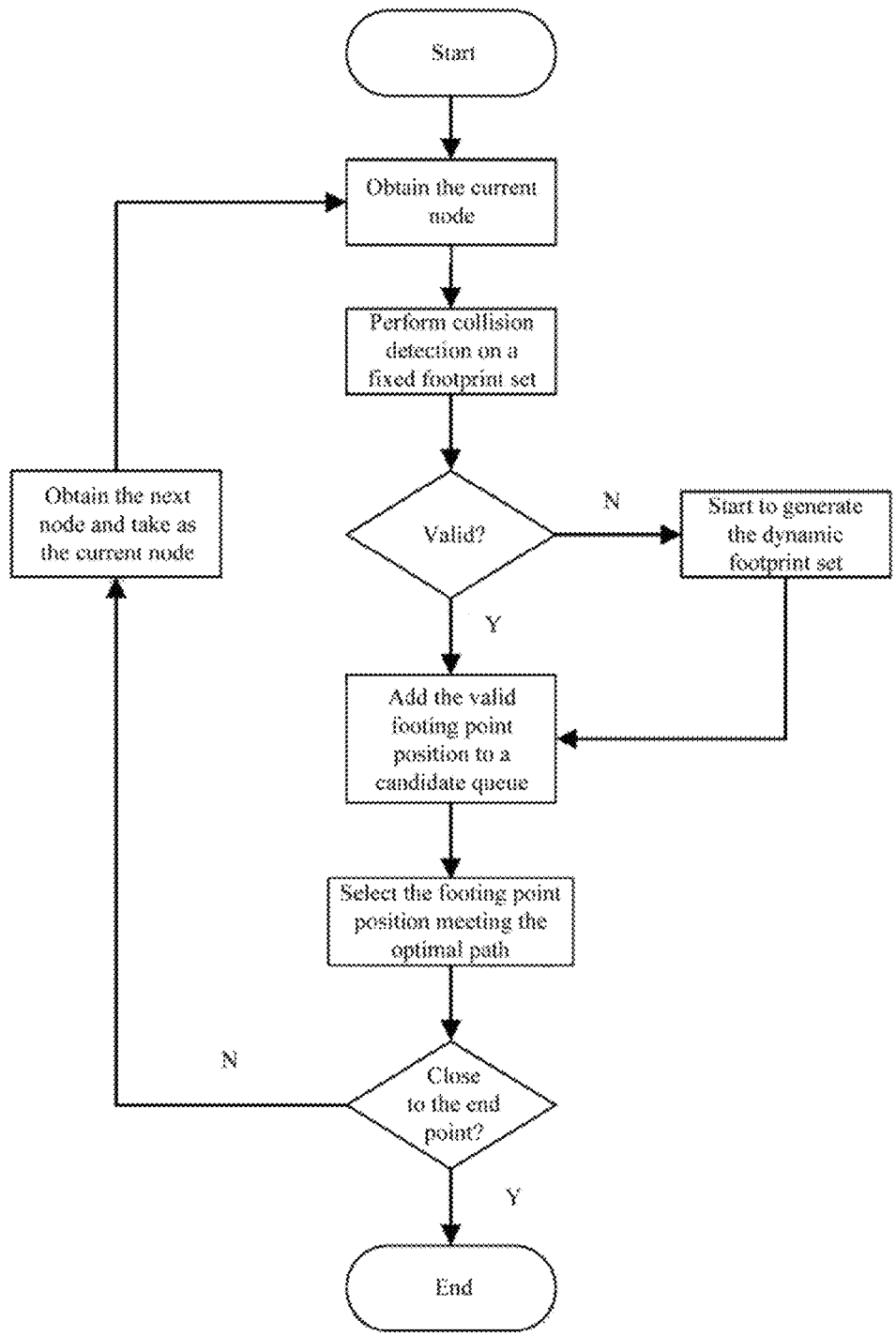
FIG. 6 is a flow chart of an optimal path of navigation planning according to an embodiment of the present disclosure.

FIG. 6 is a flow chart of an optimal path of navigation planning according to an embodiment of the present disclosure. As shown in FIG. 6, in one embodiment, when the biped robot performs navigation planning, it obtains the current node first, performs collision detection on the landing point positions in the preset fixed footprint set. If a valid landing point position without collision is found, which will be directly added to the candidate queue of the current node without generating the dynamic footprint set. If there is no valid landing point position in the fixed footprint set, the generation of the dynamic footprint set is started and add the valid landing point positions in the generated dynamic footprint set to the candidate queue. After selecting the footprints that meet the optimal path from the candidate queue, it checks whether the current node is close to the end point. If not close to the end point, the next node is obtained, and the next node is taken as the current node, then the step of obtaining the current node is executed; if close to the end point, the sequence of the landing point position of the optimal path is released to complete the navigation planning of the optimal path.

Figure 7:
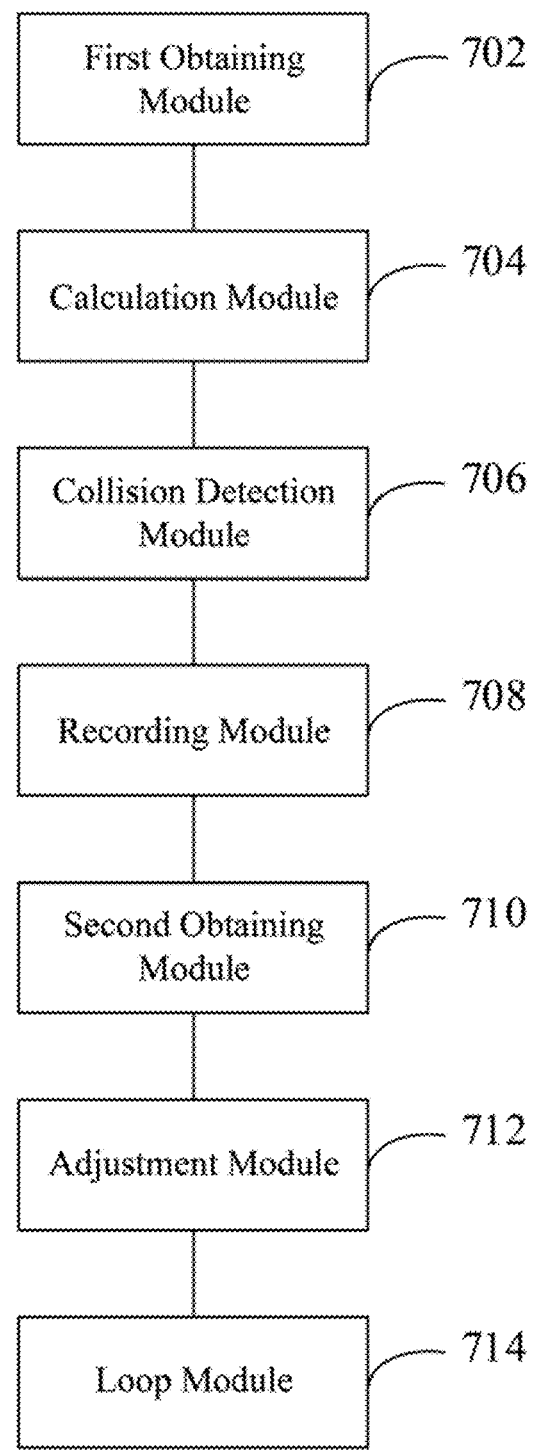
FIG. 7 is a schematic block diagram of a dynamic footprint set generation apparatus according to an embodiment of the present disclosure.

FIG. 7 is a schematic block diagram of a dynamic footprint set generation apparatus according to an embodiment of the present disclosure. As shown in FIG. 7, in one embodiment, a dynamic footprint set generation apparatus applied to the biped robot is provided. The apparatus may include:

a first obtaining module 702 configured to obtaining preset footprint calculation parameters, where the preset footprint calculation parameters include a preset displacement angle and a preset minimum rotation angle;

a calculation module 704 configured to calculating a landing point displacement based on the preset displacement angle, calculating a landing point rotation angle based on the preset displacement angle and the preset minimum rotation angle, and calculating a landing point position based on the landing point displacement and the landing point rotation angle, where the landing point rotation angle is for controlling an orientation of a swinging leg of the two legs;

a collision detection module 706 configured to determining a landing point range based on the landing point position, and performing a collision detection based on the landing point range to obtain a detection result;

a recording module 708 configured to recording the landing point position in a footprint set in response to the corresponding detection result representing there being no collision;

a second obtaining module 710 configured to obtaining a preset first displacement angle adjustment amplitude;

an adjustment module 712 configured to updating the preset displacement angle based on the preset first displacement angle adjustment amplitude; and a loop module 714 configured to returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

In one embodiment, after the performing the collision detection based on the landing point range to obtain the detection result, further includes: determining the landing point displacement corresponding to the landing point position in response to the corresponding detection result representing there being a collision; obtaining the preset displacement adjustment amplitude; updating the landing point displacement based on the preset displacement adjustment amplitude, and calculating the updated landing point position based on the updated landing point displacement; and returning to the performing the collision detection based on the landing point range to obtain the detection result.

In one embodiment, after the updating the landing point displacement based on the preset displacement adjustment amplitude, further includes: determining whether the updated landing point displacement is less than a preset threshold, and returning to the calculating the updated landing point position based on the updated landing point displacement in response to the updated landing point displacement being not less than the preset threshold; obtaining a preset second displacement angle adjustment amplitude in response to the updated landing point displacement being less than the preset threshold, where the preset second displacement angle adjustment amplitude is less than the preset first displacement angle adjustment amplitude; updating the preset displacement angle based on the preset second displacement angle adjustment amplitude; and returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

In one embodiment, the calculating the landing point displacement based on the preset displacement angle, determining the landing point rotation angle based on the preset displacement angle and the preset minimum rotation angle, and determining the landing point position basal on the landing point displacement and the landing point rotation angle until the footprint set is generated includes: determining the footprint set as having been generated in response to the updated preset displacement angle meeting a preset threshold condition.

In one embodiment, the calculating the landing point rotation angle based on the preset displacement angle and the preset minimum rotation angle includes: using the preset displacement angle as the landing point rotation angle in response to the preset displacement angle being larger than the preset minimum rotation angle; and using the preset minimum rotation angle as the landing point rotation angle in response to the preset displacement angle being smaller than the preset minimum rotation angle.

In one embodiment, the calculating the landing point displacement based on the preset displacement angle, determining the landing point rotation angle based on the preset displacement angle and the preset minimum rotation angle, and determining the landing point position based on the landing point displacement and the landing point rotation angle includes:

calculating the landing point position through an equation of:

$$f\alpha = \begin{cases} 0.3 * \sqrt{(\cos \alpha/3)^2 + (\sin \alpha)^2} & (0° < \alpha \leq 90°) \\ 0.1 * \sqrt{(\cos \alpha)^2 + (\sin \alpha)^2} & (-90° < \alpha \leq 0°) \end{cases} \quad (1)$$

; and $$\beta = \max(\alpha, \beta_{min}); \quad (2)$$

where, $\alpha$ is a displacement angle of the swinging leg, $f_\alpha$ is a displacement of the swinging leg, $\beta$ is a rotation angle of the swinging leg, and $\beta_{min}$ is the preset minimum rotation angle.

In which, equation (1) is for calculating the corresponding landing point displacement based on the displacement angle, and equation (2) is for calculating the landing point rotation angle based on the displacement angle. The landing point position is obtained based on the calculated landing point displacement and landing point rotation angle.

In one embodiment, after the determining the footprint set as having been generated, the dynamic footprint set generation method further includes: adding the landing point positions in the footprint set to a candidate queue of the next node of the robot, so that the biped robot selects a footprint meeting an optimal path from the candidate queue.

Figure 8:
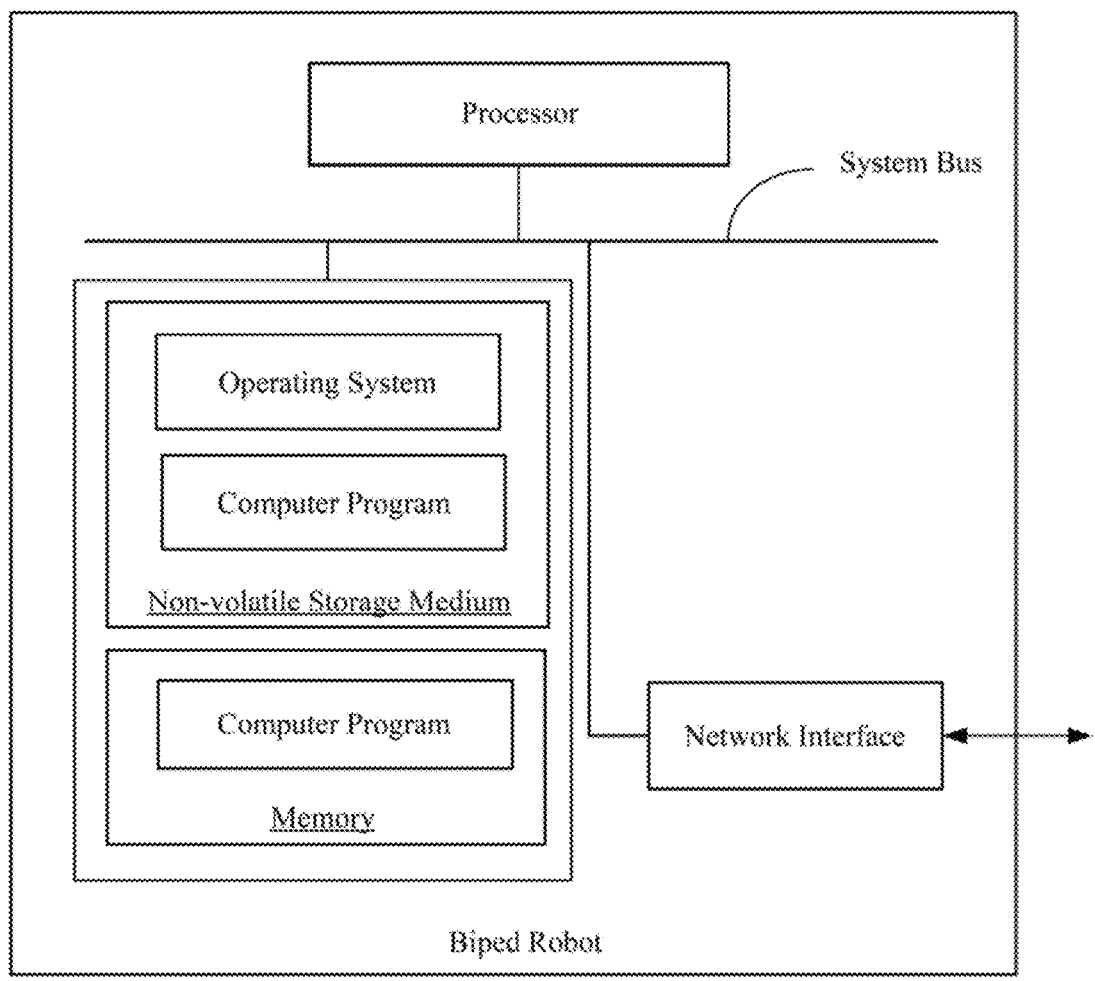
FIG. 8 is a schematic block diagram of a biped robot according to an embodiment of the present disclosure.

FIG. 8 is a schematic block diagram of a biped robot according to an embodiment of the present disclosure. As shown in FIG. 8, the biped robot includes a processor, a memory, und a network interface which are connected through a system bus. In which, the memory includes a non-volatile storage medium and an internal memory. The non-volatile storage medium of the biped robot stores an operating system, and may also store a computer program which enables the processor to implement the dynamic footprint set generation method for biped robot sensors when executed by the processor. The internal memory may also store a computer program which enables the processor to perform the dynamic footprint set generation method for biped robot sensors when executed by the processor. The network interface is used to communicate with the exterior. It can be understood by those skilled in the art that, the structure shown in FIG. 8 is only a block diagram of a part of the structure related to the scheme of the present disclosure, and does not constitute a limitation of the biped robot to which the scheme of the present disclosure is applied. The specific biped robot may include more or fewer components than shown in the figures, or some components can be combined, or can have different component arrangements.

In one embodiment, a non-transitory computer-readable storage medium stored with a computer program is provided. When the computer program is executed by a processor, the processor executes the following steps: obtaining preset footprint calculation parameters, where the preset footprint calculation parameters include a preset displacement angle and a preset minimum rotation angle; calculating a landing point displacement bused on the preset displacement angle, calculating a landing point rotation angle based on the preset displacement angle and the preset minimum rotation angle, and calculating a landing point position based on the landing point displacement and the landing point rotation angle, where the landing point rotation angle is for controlling an orientation of a swinging leg of the two legs; determining a landing point range based on the landing point position, and performing a collision detection based on the landing point range to obtain a detection result; recording the landing point position in a footprint set in response to the corresponding detection result representing there being no collision; obtaining a preset first displacement angle adjustment amplitude; updating the preset displacement angle based on the preset first displacement angle adjustment amplitude; and returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

In one embodiment, after the performing the collision detection based on the landing point range to obtain the detection result, further includes: determining the landing point displacement corresponding to the landing point position in response to the corresponding detection result representing there being a collision; obtaining the preset displacement adjustment amplitude; updating the landing point displacement based on the preset displacement adjustment amplitude, and calculating the updated landing point position based on the updated landing point displacement; and returning to the performing the collision detection based on the landing point range to obtain the detection result.

In one embodiment, after the updating the landing point displacement based on the preset displacement adjustment amplitude, further includes: determining whether the updated landing point displacement is less than a preset threshold, and returning to the calculating the updated landing point position based on the updated landing point displacement in response to the updated landing point displacement being not less than the preset threshold; obtaining a preset second displacement angle adjustment amplitude in response to the updated landing point displacement being less than the preset threshold, where the preset second displacement angle adjustment amplitude is less than the preset first displacement angle adjustment amplitude; updating the preset displacement angle based on the preset second displacement angle adjustment amplitude; and returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

In one embodiment, the calculating the landing point displacement based on the preset displacement angle, determining the landing point rotation angle based on the preset displacement angle and the preset minimum rotation angle, and determining the landing point position basal on the landing point displacement and the landing point rotation angle until the footprint set is generated includes: determining the footprint set as having been generated in response to the updated preset displacement angle meeting a preset threshold condition.

In one embodiment, the calculating the landing point rotation angle based on the preset displacement angle and the preset minimum relation angle includes: using the preset displacement angle as the landing point rotation angle in response to the preset displacement angle being larger than the preset minimum rotation angle; and using the preset minimum rotation angle as the landing point rotation angle in response to the preset displacement angle being smaller than the preset minimum rotation angle.

In one embodiment, the calculating the landing point displacement based on the preset displacement angle, determining the landing point rotation angle based on the preset displacement angle and the preset minimum rotation angle, and determining the landing point position based on the landing point displacement and the landing point rotation angle includes:

calculating the landing point position through an equation of:

$$f\alpha = \begin{cases} 0.3 * \sqrt{(\cos \alpha/3)^2 + (\sin \alpha)^2} & (0° < \alpha \le 90°) \\ 0.1 * \sqrt{(\cos \alpha)^2 + (\sin \alpha)^2} & (-90° < \alpha \le 0°) \end{cases} ; \text{and} \quad (1)$$

$$\beta = \max(\alpha, \beta_{min}); \quad (2)$$

where, $\alpha$ is a displacement angle of the swinging leg, $f_\alpha$ is a displacement of the swinging leg, $\beta$ is a rotation angle of the swinging leg, and $\beta_{min}$ is the preset minimum rotation angle.

In which, equation (1) is for calculating the corresponding landing point displacement based on the displacement angle, and equation (2) is for calculating the landing point relation angle based on the displacement angle. The landing point position is obtained based on the calculated landing point displacement and landing point rotation angle.

In one embodiment, after the determining the footprint set as having been generated, the dynamic footprint set generation method further includes: adding the landing point positions in the footprint set to a candidate queue of the next node of the robot, so that the biped robot selects a footprint meeting an optimal path from the candidate queue.

In one embodiment, a biped robot including a storage and a processor is provided. The storage stores a computer program. When the computer program is executed by the processor, the processor executes the following steps: obtaining preset footprint calculation parameters, where the preset footprint calculation parameters include a preset displacement angle and a preset minimum rotation angle; calculating a landing point displacement based on the preset displacement angle, calculating a landing point rotation angle based on the preset displacement angle and the preset minimum rotation angle, and calculating a landing point position based on the landing point displacement and the landing point rotation angle, where the landing point rotation angle is for controlling an orientation of a swinging leg of the two legs; determining a landing point range based on the landing point position, and performing a collision detection based on the landing point range to obtain a detection result; recording the landing point position in a footprint set in response to the corresponding detection result representing there being no collision; obtaining a preset first displacement angle adjustment amplitude; updating the preset displacement angle based on the preset first displacement angle adjustment amplitude; and returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

In one embodiment, after the performing the collision detection based on the landing point range to obtain the detection result, further includes: determining the landing point displacement corresponding to the landing point position in response to the corresponding detection result representing there being a collision; obtaining the preset displacement adjustment amplitude; updating the landing point displacement based on the preset displacement adjustment amplitude, and calculating the updated landing point position based on the updated landing point displacement; and returning to the performing the collision detection based on the landing point range to obtain the detection result.

In one embodiment, after the updating the landing point displacement based on the preset displacement adjustment amplitude, further includes: determining whether the updated landing point displacement is less than a preset threshold, and returning to the calculating the updated landing point position based on the updated landing point displacement in response to the updated landing point displacement being not less than the preset threshold; obtaining a preset second displacement angle adjustment amplitude in response to the updated landing point displacement being less than the preset threshold, where the preset second displacement angle adjustment amplitude is less than the preset first displacement angle adjustment amplitude; updating the preset displacement angle based on the preset second displacement angle adjustment amplitude; and returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

In one embodiment, the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated includes: determining the footprint set as having been generated in response to the updated preset displacement angle meeting a preset threshold condition.

In one embodiment, the calculating the landing point rotation angle based on the preset displacement angle and the preset minimum rotation angle includes: using the preset displacement angle as the landing point rotation angle in response to the preset displacement angle being larger than the preset minimum rotation angle; and using the preset minimum rotation angle as the landing point rotation angle in response to the preset displacement angle being smaller than the preset minimum rotation angle.

In one embodiment, the calculating the landing point displacement based on the preset displacement angle, determining the landing point rotation angle based on the preset displacement angle and the preset minimum rotation angle, and determining the landing point position bused on the landing point displacement and the landing point rotation angle includes:

calculating the landing point position through an equation of:

$$f\alpha = \begin{cases} 0.3 * \sqrt{(\cos \alpha/3)^2 + (\sin \alpha)^2} & (0° < \alpha \le 90°) \\ 0.1 * \sqrt{(\cos \alpha)^2 + (\sin \alpha)^2} & (-90° < \alpha \le 0°) \end{cases} \quad ; \text{and} \quad (1)$$

$$\beta = \max(\alpha, \beta_{min}); \quad (2)$$

where, $\alpha$ is a displacement angle of the swinging leg, $f_\alpha$ is a displacement of the swinging leg, $\beta$ is a rotation angle of the swinging leg, and $\beta_{min}$ is the preset minimum rotation angle.

In which, equation (1) is for calculating the corresponding landing point displacement based on the displacement angle, and equation (2) is for calculating the landing point rotation angle based on the displacement angle. The landing point position is obtained based on the calculated landing point displacement and landing point rotation angle.

In one embodiment, after the determining the footprint set as having been generated, the dynamic footprint set generation method further includes: adding the landing point positions in the footprint set to a candidate queue of the next node of the robot, so that the biped robot selects a footprint meeting an optimal path from the candidate queue.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

The technical features of the above-mentioned embodiments can be arbitrarily combined. For the sake of brevity of description, the descriptions do not include all possible combinations of the technical features in the above-mentioned embodiments. However, the combination of these technical features will be considered to be within the scope described in this specification as long as there is no contradiction.

The above-mentioned embodiments are merely illustrative of several embodiments of the present disclosure. Although the description is specific and detailed, it should not to be comprehended as limiting the scope of the present disclosure. It should be noted that, for those skilled in the art, a number of variations and improvements can still be made without departing from the spirit and scope of the present disclosure. Therefore, the scope of the present disclosure should be determined by the appended claims.

What is claimed is:

1. A computer-implemented dynamic footprint set generation method for a biped robot having two legs, comprising steps of:
    obtaining preset footprint calculation parameters, wherein the preset footprint calculation parameters include a preset displacement angle and a preset minimum rotation angle;
    calculating a landing point displacement based on the preset displacement angle, calculating a landing point rotation angle based on the preset displacement angle and the preset minimum rotation angle, and calculating a landing point position based on the landing point displacement and the landing point rotation angle, wherein the landing point rotation angle is for controlling an orientation of a swinging leg of the two legs;
    determining a landing point range based on the landing point position, and performing a collision detection based on the landing point range to obtain a detection result;
    recording the landing point position in a footprint set in response to the corresponding detection result representing there being no collision;
    obtaining a preset first displacement angle adjustment amplitude;
    updating the preset displacement angle based on the preset first displacement angle adjustment amplitude;
    returning to the step of calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated; and
    outputting the footprint set to control the biped robot to walk according to the footprint set;
    wherein the calculating the landing point rotation angle based on the preset displacement angle and the preset minimum rotation angle comprises:
    using the preset displacement angle as the landing point rotation angle in response to the preset displacement angle being larger than the preset minimum rotation angle; and
    using the preset minimum rotation angle as the landing point rotation angle in response to the preset displacement angle being smaller than the preset minimum rotation angle.

2. The method of claim 1, wherein after the performing the collision detection based on the landing point range to obtain the detection result, further comprises:
    determining the landing point displacement corresponding to the landing point position in response to the corresponding detection result representing there being a collision;
    obtaining the preset displacement adjustment amplitude;
    updating the landing point displacement based on the preset displacement adjustment amplitude, and calculating the updated landing point position based on the updated landing point displacement; and
    returning to the step of performing the collision detection based on the landing point range to obtain the detection result.

3. The method of claim 2, wherein after the updating the landing point displacement based on the preset displacement adjustment amplitude, further comprises:
    determining whether the updated landing point displacement is less than a preset threshold, and returning to the step of calculating the updated landing point position based on the updated landing point displacement in response to the updated landing point displacement being not less than the preset threshold;
    obtaining a preset second displacement angle adjustment amplitude in response to the updated landing point displacement being less than the preset threshold, wherein the preset second displacement angle adjustment amplitude is less than the preset first displacement angle adjustment amplitude;
    updating the preset displacement angle based on the preset second displacement angle adjustment amplitude; and
    returning to the step of calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

4. The method of claim 3, wherein returning to the step of calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated further comprises:
    determining the footprint set as having been generated in response to the updated preset displacement angle meeting a preset threshold condition.

5. The method of claim 1, wherein the landing point position comprises: the landing point displacement and the landing point rotation angle, and the determining the landing point position based on the landing point displacement and the landing point rotation angle comprises:
    calculating the landing point position through an equation of:

$$f\alpha = \begin{cases} 0.3 * \sqrt{(\cos \alpha/3)^2 + (\sin \alpha)^2} & (0° < \alpha \leq 90°) \\ 0.1 * \sqrt{(\cos \alpha)^2 + (\sin \alpha)^2} & (-90° < \alpha \leq 0°) \end{cases} ; \text{and} \quad (1)$$

-continued $$\beta = \max(\alpha, \beta_{min}); \quad (2)$$

where, α is a displacement angle of the swinging leg, $f_\alpha$ is a displacement of the swinging leg, β is a rotation angle of the swinging leg, and $\beta_{min}$ is the preset minimum rotation angle.

6. The method of claim 4, wherein after the determining the footprint set as having been generated, further comprises:
adding the landing point positions in the footprint set to a candidate queue of the next node of the robot, so that the biped robot selects a footprint meeting an optimal path from the candidate queue.

7. A non-transitory computer readable storage medium for storing one or more computer programs, wherein the one or more computer programs comprise:
instructions for obtaining preset footprint calculation parameters, wherein the preset footprint calculation parameters include a preset displacement angle and a preset minimum rotation angle;
instructions for calculating a landing point displacement based on the preset displacement angle, calculating a landing point rotation angle based on the preset displacement angle and the preset minimum rotation angle, and calculating a landing point position based on the landing point displacement and the landing point rotation angle, wherein the landing point rotation angle is for controlling an orientation of a swinging leg of the two legs;
instructions for determining a landing point range based on the landing point position, and performing a collision detection based on the landing point range to obtain a detection result;
instructions for recording the landing point position in a footprint set in response to the corresponding detection result representing there being no collision;
instructions for obtaining a preset first displacement angle adjustment amplitude;
instructions for updating the preset displacement angle based on the preset first displacement angle adjustment amplitude;
instructions for returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated; and
instructions for outputting the footprint set to control the biped robot to walk according to the footprint set;
wherein the instructions for calculating the landing point rotation angle based on the preset displacement angle and the preset minimum rotation angle comprise:
instructions for using the preset displacement angle as the landing point rotation angle in response to the preset displacement angle being larger than the preset minimum rotation angle; and
instructions for using the preset minimum rotation angle as the landing point rotation angle in response to the preset displacement angle being smaller than the preset minimum rotation angle.

8. The storage medium of claim 7, wherein the one or more computer programs further comprise:
instructions for determining the landing point displacement corresponding to the landing point position in response to the corresponding detection result representing there being a collision;
instructions for obtaining the preset displacement adjustment amplitude;
instructions for updating the landing point displacement based on the preset displacement adjustment amplitude, and calculating the updated landing point position based on the updated landing point displacement; and
instructions for returning to the performing the collision detection based on the landing point range to obtain the detection result.

9. The storage medium of claim 8, wherein the one or more computer programs further comprise:
instructions for determining whether the updated landing point displacement is less than a preset threshold, and returning to the calculating the updated landing point position based on the updated landing point displacement in response to the updated landing point displacement being not less than the preset threshold;
instructions for obtaining a preset second displacement angle adjustment amplitude in response to the updated landing point displacement being less than the preset threshold, wherein the preset second displacement angle adjustment amplitude is less than the preset first displacement angle adjustment amplitude;
instructions for updating the preset displacement angle based on the preset second displacement angle adjustment amplitude; and
instructions for returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

10. The storage medium of claim 9, wherein the instructions for returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated further comprise:
instructions for determining the footprint set as having been generated in response to the updated preset displacement angle meeting a preset threshold condition.

11. The storage medium of claim 7, wherein the landing point position comprises: the landing point displacement and the landing point rotation angle, and the instructions for determining the landing point position based on the landing point displacement and the landing point rotation angle comprise:
instructions for calculating the landing point position through an equation of:

$$f\alpha = \begin{cases} 0.3 * \sqrt{(\cos \alpha/3)^2 + (\sin \alpha)^2} & (0° < \alpha \leq 90°) \\ 0.1 * \sqrt{(\cos \alpha)^2 + (\sin \alpha)^2} & (-90° < \alpha \leq 0°) \end{cases} \quad ; \text{and} \quad (1)$$

$$\beta = \max(\alpha, \beta_{min}); \quad (2)$$

where, α is a displacement angle of the swinging leg, $f_\alpha$ is a displacement of the swinging leg, β is a rotation angle of the swinging leg, and $\beta_{min}$ is the preset minimum rotation angle.

12. A biped robot, comprising:
   a processor;
   a memory coupled to the processor; and
   one or more computer programs stored in the memory and executable on the processor;
   wherein, dynamic footprint set generation the one or more computer programs comprise:
      instructions for obtaining preset footprint calculation parameters, wherein the preset footprint calculation parameters include a preset displacement angle and a preset minimum rotation angle, and wherein the preset displacement angle refers to an acute or right angle formed between a displacement of a swinging lea of the biped robot and a horizontal line;
      instructions for calculating a landing point displacement based on the preset displacement angle, calculating a landing point rotation angle based on the preset displacement angle and the preset minimum rotation angle, and calculating a landing point position based on the landing point displacement and the landing point rotation angle, wherein the landing point rotation angle is an acute or right angle formed by an orientation of the swinging lea and the horizontal line and is for controlling the orientation of the swinging leg, and wherein the landing point displacement refers to a displacement of the swinging lee in swinging, and comprises a distance and an orientation;
      instructions for determining a landing point range based on the landing point position, and performing a collision detection based on the landing point range to obtain a detection result;
      instructions for recording the landing point position in a footprint set in response to the corresponding detection result representing there being no collision;
      instructions for obtaining a preset first displacement angle adjustment amplitude;
      instructions for updating the preset displacement angle based on the preset first displacement angle adjustment amplitude;
      instructions for returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated; and
      instructions for outputting the footprint set to control the biped robot to walk according to the footprint set.

13. The biped robot of claim 12, wherein the one or more computer programs further comprise:
   instructions for determining the landing point displacement corresponding to the landing point position in response to the corresponding detection result representing there being a collision;
   instructions for obtaining the preset displacement adjustment amplitude;
   instructions for updating the landing point displacement based on the preset displacement adjustment amplitude, and calculating the updated landing point position based on the updated landing point displacement; and
   instructions for returning to the performing the collision detection based on the landing point range to obtain the detection result.

14. The biped robot of claim 13, wherein the one or more computer programs further comprise:
   instructions for determining whether the updated landing point displacement is less than a preset threshold, and returning to the calculating the updated landing point position based on the updated landing point displacement in response to the updated landing point displacement being not less than the preset threshold;
   instructions for obtaining a preset second displacement angle adjustment amplitude in response to the updated landing point displacement being less than the preset threshold, wherein the preset second displacement angle adjustment amplitude is less than the preset first displacement angle adjustment amplitude:
   instructions for updating the preset displacement angle based on the preset second displacement angle adjustment amplitude; and
   instructions for returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated.

15. The biped robot of claim 14, wherein the instructions for returning to the calculating the landing point displacement based on the preset displacement angle, determining the landing point rotation angle based on the preset displacement angle and the preset minimum rotation angle, and determining the landing point position based on the landing point displacement and the landing point rotation angle until the footprint set is generated further comprise:
   instructions for determining the footprint set as having been generated in response to the updated preset displacement angle meeting a preset threshold condition.

16. The biped robot of claim 12, wherein the instructions for calculating the landing point rotation angle based on the preset displacement angle and the preset minimum rotation angle comprise:
   instructions for using the preset displacement angle as the landing point rotation angle in response to the preset displacement angle being larger than the preset minimum rotation angle; and
   instructions for using the preset minimum rotation angle as the landing point rotation angle in response to the preset displacement angle being smaller than the preset minimum rotation angle.

17. The biped robot of claim 12, wherein the landing point position comprises: the landing point displacement and the landing point rotation angle, and the instructions for determining the landing point position based on the landing point displacement and the landing point rotation angle comprise:
   instructions for calculating the landing point position through an equation of:

$$f\alpha = \begin{cases} 0.3 * \sqrt{(\cos \alpha/3)^2 + (\sin \alpha)^2} & (0° < \alpha \leq 90°) \\ 0.1 * \sqrt{(\cos \alpha)^2 + (\sin \alpha)^2} & (-90° < \alpha \leq 0°) \end{cases} \quad ; \text{and} \tag{1}$$

$$\beta = \max(\alpha, \beta_{min}); \tag{2}$$

where, α is a displacement angle of the swinging leg, $f_α$ is a displacement of the swinging leg, β is a rotation angle of the swinging leg, and $β_{min}$ is the preset minimum rotation angle.

18. The biped robot of claim 15, wherein the one or more computer programs further comprise:
instructions for adding the landing point positions in the footprint set to a candidate queue of the next node of the robot, so that the biped robot selects a footprint meeting an optimal path from the candidate queue.

19. The biped robot of claim 12, wherein performing the collision detection based on the landing point range to obtain a detection result comprises:
traversing the pixels in the landing point range to identify whether there is an obstacle in the landing point range, wherein the obstacle has a different color from background.

20. The biped robot of claim 12, wherein performing the collision detection based on the landing point range to obtain a detection result comprises:
inputting an image of the landing point range into a trained neural network for identification; and
obtaining the detection result according to a result outputted by the trained neural network.

* * * * *